United States Patent
Dennis et al.

(10) Patent No.: US 7,240,096 B1
(45) Date of Patent: Jul. 3, 2007

(54) SYSTEM AND METHOD FOR PROVIDING SERVICE TECHNICIANS ACCESS TO DISPATCH INFORMATION

(75) Inventors: Gary J. Dennis, Duluth, GA (US); Charles W. Garris, Peachtree City, GA (US); Robert T. Ingman, Peachtree City, GA (US); Terri H. Pifer, Kennesaw, GA (US); Diana S. Allen, Margate, FL (US)

(73) Assignee: Bell South Intellectual Property Corp., Wilmington, DE (US)

( * ) Notice: Subject to any disclaimer, the term of this patent is extended or adjusted under 35 U.S.C. 154(b) by 626 days.

(21) Appl. No.: 10/259,739

(22) Filed: Sep. 30, 2002

(51) Int. Cl.
*G06F 12/00* (2006.01)
*G06F 17/30* (2006.01)

(52) U.S. Cl. .................... 709/206; 707/201; 707/28; 707/100; 379/9.03; 379/9.02; 379/9.04; 379/29.09

(58) Field of Classification Search ............... 709/206, 709/216, 218, 204; 707/201–204, 28, 100; 370/217, 235; 379/9.03, 9.02
See application file for complete search history.

(56) References Cited

U.S. PATENT DOCUMENTS

| | | | | |
|---|---|---|---|---|
| 6,065,046 A | * | 5/2000 | Feinberg et al. | 709/216 |
| 6,345,281 B1 | * | 2/2002 | Kardos et al. | 707/201 |
| 6,510,454 B1 | * | 1/2003 | Walukiewicz | 709/206 |
| 6,665,699 B1 | * | 12/2003 | Hunter et al. | 718/102 |
| 6,870,900 B1 | * | 3/2005 | Beamon | 379/9.03 |

* cited by examiner

*Primary Examiner*—Jeffrey Pwu
*Assistant Examiner*—Jude Jean-Gilles
(74) *Attorney, Agent, or Firm*—Withers & Keys, LLC

(57) ABSTRACT

A secondary source of dispatch information is provided in the event of a failure of a primary source of dispatch information. The second source of dispatch information can be accessed electronically by service technicians in the field when the primary source of dispatch information fails so that service technicians do not have to contact operators in a central office to obtain the dispatch information. The secondary source of dispatch information can distribute the dispatch information in a number of ways including e-mail, web and other methods.

31 Claims, 3 Drawing Sheets

SYSTEM AND METHOD FOR PROVIDING SERVICE TECHNICIANS ACCESS TO DISPATCH INFORMATION

BACKGROUND

1. Field of the Invention

The present invention relates generally to systems that use redundancy to provide access to information stored on failed systems. More particularly, the present invention relates to providing access to dispatch information for service technicians to more effectively schedule their tasks in the event that their primary source of dispatch information is unavailable.

2. Background of the Invention

Integrated dispatch systems (IDSs), such as Telcordia's Media Vantage Force, are commonly used to schedule dispatch of service technicians. These service technicians can be generally classified as either installation technicians or maintenance technicians. Installation technicians primarily install new services. Maintenance technicians primarily respond to trouble calls. The service technicians are placed in the field to respond to service orders that can range in nature from installations to repairs.

Internally, service orders are tracked using documents called trouble tickets. The trouble tickets contain information related to service jobs that are to be performed by the service technicians. Generally, the trouble tickets are maintained in electronic form and stored in the IDS. The IDS is responsible for scheduling the service jobs using the information contained in the trouble tickets.

Database servers in IDS systems use proprietary software (e.g., Telcordia's Media Vantage Force software) to retain all information about customers who had have reported problems and the status of installation orders. Generally, the information is stored in the electronic trouble tickets described above. These database servers are accessed to obtain dispatch information that is required to efficiently dispatch service technicians to complete their jobs. If access to the dispatch information is interrupted (for example, due to a power failure or some other interruption), and is not available to the technicians, the technicians cannot efficiently determine where they should be or what jobs that should complete. Consequently, their productivity is greatly reduced.

There has been a move to mechanize distribution of dispatch information to technicians. Mechanization allows decentralized access to the dispatch information and reduction in the effort required to respond to technician dispatch requests. For example, a technician equipped with a laptop computer can access dispatch information in the IDS' database servers via a wireless network in a mechanized dispatch information system. Generally, an application server provides the interface for the technician to access the dispatch information.

Paper records have been maintained during the mechanization process to provide a backup in the event of a failure of the IDS system. In the loop maintenance operating system (LMOS) Mapper dispatching system, for example, reports are run periodically throughout the day that obtain a snapshot of the load at the time the report was run. The load indicates where technicians are dispatched and what jobs they were working on. Though these reports are generally a few hours old, they provide a backup in the event of an IDS failure that prevents technician access to the dispatch information. When such failures occur, technicians in the field contact operators to get dispatch information such as new task updates or information regarding existing tasks. The operator identifies the appropriate paper record report that contains the dispatch information that is required to respond to the technician's query.

One problem with older systems such as LMOS Mapper is limited capacity. Large service companies, such as large telephone companies, can have more than 15,000 technicians to service maintenance and installation requests. This number of technicians exceeds the capacity of the LMOS Mapper dispatch system. As a result, newer systems are being developed to handle these larger numbers of technicians. One of the ways for achieving the increased capacity in the new systems is to eliminate the generation of the backup paper records. Elimination of the backup paper records frees processor cycles that can be used to service the larger number of technicians. However, elimination of the paper records also precludes their use by operators to assist technicians in the event of IDS failure.

Another problem that arises from the move to mechanized dispatch information distribution is that fewer staff are retained to answer calls from service technicians when the IDS failed. The remaining staff would be likely overwhelmed by dispatch information request calls made by the thousands of technicians in the field in the event of an IDS failure.

As a result, without the paper records, it is generally difficult for a large service company to dispatch its service technicians when access to the IDS is interrupted. Compounding the problem, the remaining staff cannot hope to respond to the thousands of technician requests that would occur in the event of an IDS system failure. Consequently, 15,000 technicians or more could be left with literally nothing to do. This possibility is a significant risk associated with newer systems.

Newer systems may also include one or more terminals available that can be used to access the information in a database server to be used for dispatching technicians. These direct access terminals do not adequately solve the foregoing problems for at least two reasons. First, there is insufficient staff to operate such terminal(s). Second, these terminals cannot be used if the database itself fails. As a result, even direct database access terminals do not assure adequate coverage in the event of system failure.

SUMMARY OF THE INVENTION

The present invention solves the foregoing problems with conventional IDS systems by providing a backup information device accessible to technicians in the event of failure of the primary source of the dispatch information. Preferably, the backup information device does not rely on the operation of the database servers in the primary source of the dispatch information. For clarity, the present invention is described for embodiments in which the primary source of dispatch information is an IDS. It should be noted that any system that can retrievably store dispatch information can be used as the primary source of dispatch information. Preferably, the backup information device distributes the dispatch information electronically so that it does not require maintenance of the paper records for backup. As a result, the present invention avoids the capacity constraints of conventional systems that generate backup paper records.

In one embodiment, the present invention is a system for providing dispatch information to a service technician. The system includes a primary source of dispatch information accessible to a technician and a backup information device accessible to the technician using an access device in the event the primary source of dispatch information fails. A database store is included for storing dispatch information from the primary source of dispatch information. The database store transfers dispatch information to the backup information device when the technician cannot access the dispatch information stored thereon. The information can be transferred from the primary source of dispatch information to the database store periodically or at pre-determined times In another embodiment, the present invention is a method for providing dispatch information to a service technician. The method includes the steps of storing the dispatch information on a primary source of dispatch information as well as in a database store. The information can be stored in the database store periodically or at pre-determined times. When a service technician can no longer access the dispatch information stored on the primary source of dispatch information, the method includes the step of transferring the dispatch information from the database store to a backup information device. A request for dispatch information is received from a service technician while the primary source of dispatch information is inaccessible to the service technician. The requested dispatch information is provided to the requesting service technician from the backup information device in response to the request.

DETAILED DESCRIPTION OF THE INVENTION

Figure 1:
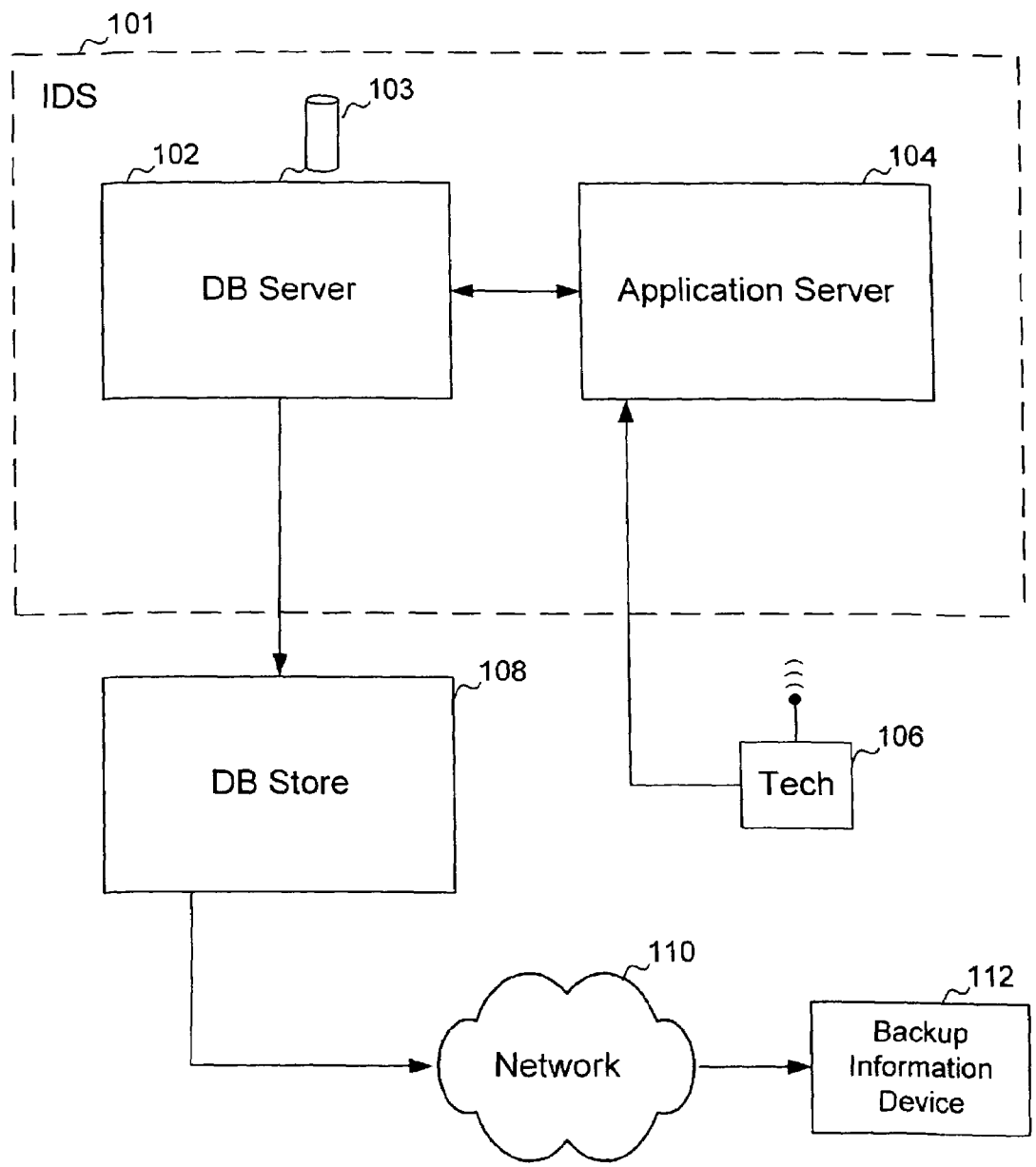
FIG. 1 is a schematic diagram of a system for providing service technicians access to dispatch information in the event of IDS system failure according to an embodiment of the present invention.

FIG. 1 is a schematic diagram of a preferred embodiment of a system for providing access to distribution information for a service technician if an IDS fails according to an embodiment of the present invention. An IDS 101 includes a database server 102 and an application server 104. An exemplary database server 102 is the V2600 available from Hewlett-Packard Company of Palo Alto, Calif. An exemplary application server is the N4000 available from Hewlett-Packard Company. In general, IDS 101 can have one or more database servers and one or more application servers. In addition, there can be multiple instances of IDS 101 to perform dispatch functions in multiple geographies. For example, one IDS instance can be assigned to perform dispatch functions for the western part of a service area, and another IDS instance can perform dispatch function for the eastern part of a service area.

Application server 104 preferably executes the IDS application. Database server 102 preferably manages information stored in a database 103. The information stored in database 103 includes information about customers who have reported maintenance problems, as well as information regarding the status of installation orders. Application server 104 obtains information from trouble tickets corresponding to maintenance and installation service requests from database server 102.

A technician 106 is in communication with application server 104. This communication can be by any means for communicating with application server 104. For example, technician 106 can use a laptop computer, a two-way pager, a telephone (where application server 104 can be controlled by voice command or by punching numbers in the telephone's keypad), a personal digital assistant (PDA) or any other means of communicating with application server 104.

Application server 104 provides technician 106 with information about his or her jobs, including what the job is, job location, trouble ticket or installation ticket number, customer information related to the job (e.g., customer name and telephone number), job scheduled time, who is assigned specific tasks related to the job and other information related to the job. When technician 106 completes work on a job, technician 106 communicates with application server 104 to close out the trouble ticket corresponding to the job. Upon closing out the trouble ticket, application server 104 can assign a new job to technician 106, according to the dispatch rules set up in the IDS application executing on application server 104.

A database store 108 is used to store an image of the data stored on database 103. In an alternative embodiment of the present invention, a plurality of database stores 108 is used to store the information. Exemplary data stores 108 include the CLARiiON, Celerra and Symmetrix families of products available from EMC Corporation of Hopkinton, Mass.

Periodically, or at user-designated times, the data stored in database 103 is downloaded to database store 108. The download updates the data stored in database 103. For example, database store 108 may be updated from database 103 every four hours. Alternatively, the data may be updated at designated times during a day. For example, the designated times may be chosen as 6:00 am, 10:00 am, 12:00 pm and 2:00 pm to more accurately coincide with the times when most changes are likely to happen. For example, if the technicians begin working at 8:00 am, there is not likely to be a significant load or ticket influx between 6:00 am and 8:00 am. Thus, it is likely that the information stored at 6:00 am will be valid.

Preferably, database store 108 overwrites previously existing data with the new data. Thus, database store 108 serves as a snapshot of the information in database 102 at particular times during a day.

The above-described architecture provides service technicians with access to dispatch information without requiring a phone call to an operator when IDS 101 fails or some other event occurs that prevents technician 106 from accessing the dispatch information stored on database 103. The dispatch information is obtained from database store 108 when database server 102 fails.

In one embodiment of the present invention, the dispatch information is stored on a backup information device 112 that can be accessed by a service technician when IDS 101 fails. An exemplary backup information 112 device is an e-mail server. Backup information device 112 can be accessed by technician 106 to obtain his or her dispatch instructions or other job-related information. For example, the information may be a location of the next job or information related to the current job, such as the nature of the problem or pertinent customer information.

Database store 108 can determine when to send its contents to backup information device 112 by monitoring an alarm condition of database server 102 that indicates when database server 102 is about to shut down. When database store 108 receives an alarm or senses that database server 102 will fail, database store 108 provides the snapshot of database server 102 that it has stored to backup information device 112. In addition, application server 104 causes the technician to communicate with backup information device 112 to obtain dispatch information.

In another embodiment of the present invention, the information from database store 108 is transferred to the backup information device whether IDS 101 fails or not. Thus, in this embodiment of the present invention, database store 108 transfers its contents to backup information device 112 regardless of need.

Backup information device 112 can be located on any network 110 accessible to database store 108. For example, database store 108 may transmit its information through the Internet, a LAN, a WAN, an intranet or any other network available to database store 108. When IDS 101 fails, technician 106 retrieves the information from backup information device 112.

In one embodiment of the present invention, backup information device 112 is an e-mail server. In this embodiment of the present invention, each technician is provided a unique e-mail account that is identified by an e-mail address that is unique to each technician.

The technician accesses the e-mail server using an e-mail account that has been assigned to him or her using an access device. The access device can be a wireless personal computer, a personal digital assistant, a mobile telephone or other device that can access the e-mail server. The desired dispatch information is then retrieved by the technician as an e-mail message.

The e-mail account is preferably protected to prevent unauthorized access to the dispatch information. For example, the account can be password protected. When the technician access the e-mail account, he or she must provide the correct password to retrieve the e-mail message containing the dispatch information.

In another example, backup information device 112 is a database accessible to the technician through a web browser using a web-enabled access device. Such web-enabled access devices include personal computers (PCs), personal digital assistants (PDAs) and other devices that can execute web-browsers that can be used to access the dispatch information. The technician logs into his or her web browser. Then, the technician enters the URL associated with the web page that provides access to the dispatch information.

The web browser implementation of the present invention preferably includes authorization protection to protect unauthorized personnel from accessing the dispatch information. For example, in one embodiment of the web browser implementation of the present invention, authorization protection is provided using a technician identification and a password. When the technician accesses the web site, the technician must enter his or her identification and password to gain access to the dispatch information.

Figure 2:
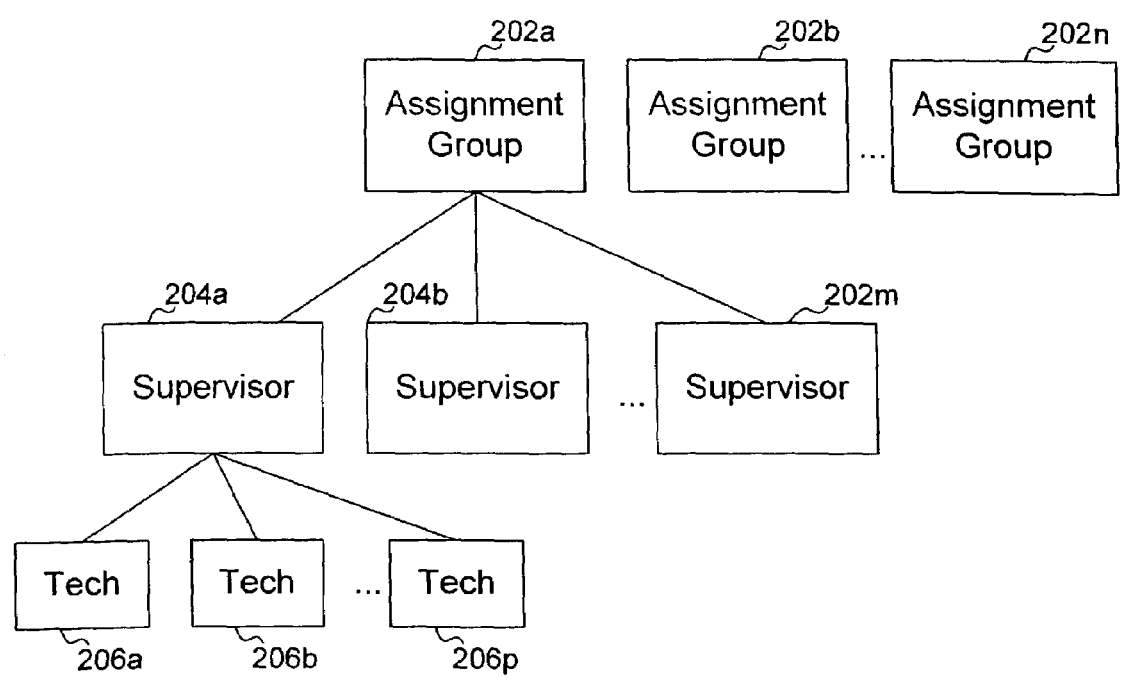
FIG. 2 is a diagram representing an architecture for storing dispatch information in an IDS database according to an embodiment of the present invention.

FIG. 2 illustrates a architecture for storing dispatch information in IDS 101 and in backup information device 112 according to an embodiment of the present invention. Preferably, the information is organized as a hierarchy. The hierarchy includes N assignment groups 202*a*, 202*b*, . . . 202*n*. N is a positive integer. An assignment group preferably corresponds to a geographic area to be served by the technicians in the assignment group.

Each assignment group has M supervisors, 204*a*, 204*b*, . . . 204*m*. M is a positive integer that can be different for each assignment group. Each supervisor oversees P technicians 206*a*, 206*b*, . . . 206*p*. P is a positive integer that can be different for each supervisor. The information is preferably stored at the assignment group level. As a result, all of the information for a particular assignment group is provided when a request for dispatch information is answered.

Because the dispatch information is stored at the assignment group level, the dispatch information required to respond to a particular technician's request must be extracted from the assignment group level information provided in response to a request for dispatch information. In one embodiment of the present invention, the dispatch information for each particular technician is extracted based on a technician identification. The technician identification can be any identification that uniquely identifies each technician. For example, the technician identification can be a social security number, an identification code, a name or any other means for uniquely identifying each technician.

When a technician accesses backup information device 112, he or she enters his or her technician identification. Backup information device 112 extracts the information corresponding to the entered technician identification from the stored assignment group information and returns the information to the technician accessing backup information device 112.

Preferably, the information is returned according to the method of access. For example, where backup information device 112 is an e-mail server, the information is returned to the technician in an e-mail message. Where backup information device 112 is a database accessible through a web-browser, the dispatch information is returned to the technician as a web page.

Figure 3:
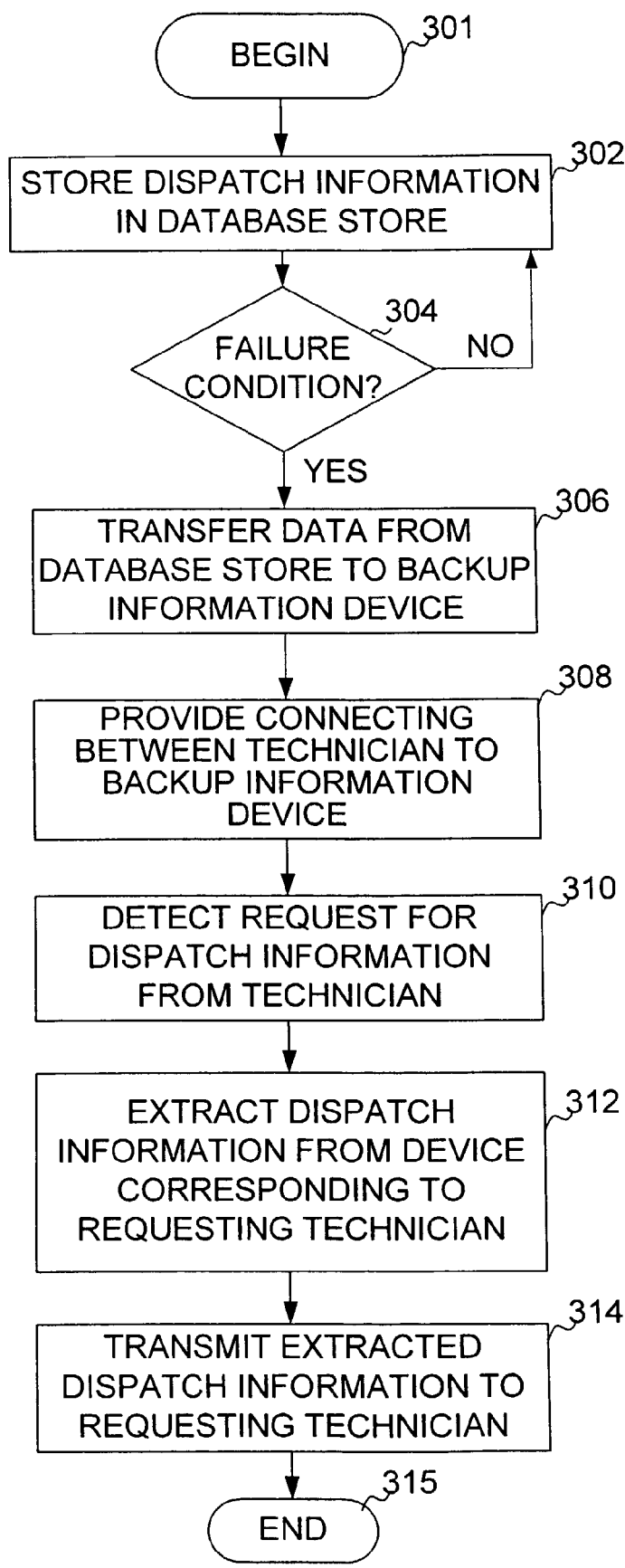
FIG. 3 is a flow chart for a method for providing dispatch information to technicians in the event of an IDS failure.

FIG. 3 is a flow chart for a method for providing access to dispatch information to service technicians when a primary dispatch information source, such as an IDS, fails. The method begins in step 301 and immediately continues in step 302 with the step of storing dispatch information in a database store. For example, as described above, IDS 101 stores dispatch information in database store 108. The storage can be performed on a periodic basis or at pre-designated times.

In step 304, the method determines if there is a failure condition that can prevent service technicians from obtaining the dispatch information stored therein. Such a failure condition can be detected either as it is happening or after it has happened. If there is no such failure condition, the method continues in step 302 by storing dispatch information in the database store at the appropriate time.

If a failure condition is detected, the dispatch information is transferred from the database store to a backup information device in step 306. As described above, exemplary backup information devices include e-mail servers and databases accessible by web servers. After the information is transferred to the backup information device, in step 308, technicians are provided connectivity to the backup information device. For example, technicians can be switched from communicating through an application server to communicating through an e-mail server. The switch can be performed by technicians and/or centrally located operators. The switch can also be performed automatically, for example, by an application server or the technician's access device.

The method continues in step 310 by detecting a request for dispatch information from a technician. In step 312, the dispatch information corresponding to the requesting technician is extracted, if required. Extraction is required if the dispatch information is returned for a group of technicians rather than on an individual technician basis. For example, as described above, the dispatch information is preferably stored at an assignment group level. Consequently, extraction is required for dispatch information returned by a system that groups dispatch information at an assignment group level. The extracted dispatch information is transmitted to the technician in step 314. The method then ends in step 315.

In the foregoing method, steps 310, 312 and 314 are repeated for as long as the failure condition persists. When the failure is repaired, the method executes step 302 and stores dispatch information from the primary dispatch information source to the database store at the appropriate time.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for providing access to dispatch information to a service technician, comprising:
   a primary source of dispatch information accessible to the service technician,
   wherein the dispatch information is organized to reflect a hierarchy of assignment groups where each assignment group has one or more supervisors and each supervisor supervises one or more service technicians and each service technician is assigned his own dispatch information access account;
   a database server to receive the dispatch information from the primary source of dispatch information for access by the service technician;
   a database store for storing the dispatch information received by the database server, wherein the database store monitors the database server operation;
   a backup information device remotely accessible to the service technician using an access device, wherein the database store transfers the dispatch information to the backup information device when the database store detects that the database server will fail such that the service technician cannot access the dispatch information stored on the primary source, wherein further still the backup information device does not rely on the operation of the database server to provide the dispatch information to the service technician.

2. The system recited in claim 1, wherein the primary source of dispatch information is an integrated dispatch system.

3. The system recited in claim 1, wherein dispatch information from the primary source of dispatch information is stored in the database store periodically.

4. The system recited in claim 1, wherein dispatch information from the secondary source of dispatch information is stored in the database store at pre-determined times during a day.

5. The system recited in claim 1, wherein the backup information device is an e-mail server and the dispatch information is converted to a form that is compatible with storage on the e-mail server.

6. The system recited in claim 5, wherein the access device is a personal computer that can access the backup information device via wireless communication.

7. The system recited in claim 5, wherein the access device is one of a personal digital assistant and a cellular telephone.

8. The system recited in claim 1, wherein the database store contains an image of the data stored on the primary source.

9. The system recited in claim 1, wherein the backup information device is a database accessible by a web server.

10. The system recited in claim 9, wherein the access device is a personal computer having a web browser executing thereon for accessing the database through the web browser.

11. The system recited in claim 9, wherein the access device is a personal digital assistant having a web browser executing thereon for accessing the database through the web browser.

12. The system recited in claim 9, wherein the access device is a cellular telephone having a web browser executing thereon for accessing the database through the web browser.

13. A method for providing access to dispatch information to a remotely located service technician, comprising the steps of:
   storing the dispatch information on a primary source of dispatch information;
   receiving the dispatch information on a database server;
   storing the dispatch information in a database store;
   transferring the dispatch information from the database store to a backup information device when the database store detects that the database server will fail such that the service technician cannot access the dispatch information stored on the primary source;
   receiving a remote request for the dispatch information from the service technician while the primary source of dispatch information is inaccessible to the service technician;
   providing the dispatch information from the backup information device to the service technician in response to the remote request, wherein the backup information device does not rely on the operation of the database server to provide the dispatch information to the service technician.

14. The method recited in claim 13, further comprising the steps of:
   determining that the primary source of dispatch information has failed; and
   transferring the dispatch information from the database store to the backup information device when the determination is made that the primary source of dispatch information has failed.

15. The method recited in claim 13, wherein the backup information device is an e-mail server further comprising the steps of:

assigning a unique e-mail account having a unique e-mail address to each technician;

converting the dispatch information received from the database store to a format compatible with the e-mail server;

receiving a request from a technician for dispatch information; and providing the requested dispatch information to the technician as an e-mail message in the e-mail account corresponding to the requesting technician.

16. The method recited in claim 15, further comprising the steps of:

extracting the dispatch information corresponding to the technician requesting the dispatch information; and returning the extracted dispatch information in the e-mail message.

17. The method recited in claim 15, further comprising the step of verifying that the technician is a valid user prior to allowing the technician access to the e-mail message having the requested dispatch information.

18. The method recited in claim 13, wherein the backup information device is a database accessible by a web server, further comprising the steps of:

receiving a request from a technician for dispatch information; and providing the requested dispatch information to the technician for display in a web-browser.

19. The method recited in claim 18, further comprising the steps of:

extracting the dispatch information corresponding to the technician requesting the dispatch information; and providing the extracted dispatch information for display in the web browser.

20. The method recited in claim 15, further comprising the step of verifying that the technician is a valid user prior to providing the requested dispatch information for display in the web browser.

21. The method recited in claim 13, further comprising the step of storing the dispatch information in the database store periodically.

22. The method recited in claim 13, further comprising the step of storing the dispatch information in the database at pre-determined times.

23. The method recited in claim 13, wherein the database store contains an image of the data stored on the primary source.

24. A method for backing up a primary source of dispatch information, comprising the steps of:

storing dispatch information on a primary source accessible to a remotely located service technician;

receiving the dispatch information on a database server;

storing an image of the dispatch information on a database store;

periodically updating the image of the dispatch information;

monitoring the primary source;

detecting that the primary source is no longer accessible to the remotely located service technician by detecting that the database server will fail such that the remotely located service technician cannot access the dispatch information stored on the primary source;

transferring dispatch information to a backup information device, wherein the remotely located service technician has access to the dispatch information on the backup information device and wherein the backup information device does not rely on the operation of the database server to provide the dispatch information to the remotely located service technician.

25. The method of claim 24, wherein the service technician accesses the information on the backup information device over the Internet.

26. The method of claim 24, wherein the service technician has access to the information on the backup information device over a local area network.

27. The method of claim 24, wherein the backup information device is an e-mail server, and the service technician is provided with a unique e-mail account.

28. The method of claim 24, wherein the backup information device is a database accessible to the service technician through a web browser.

29. The method of claim 28, wherein the service technician uses one of a personal computer and a personal data assistant.

30. The method of claim 24, wherein the dispatch information is organized as a hierarchy including assignment groups corresponding to geographic areas served by the assignment groups.

31. The method of claim 30, wherein dispatch information corresponding to a request for dispatch information from a service technician is extracted based upon an identification of the service technician.

* * * * *